United States Patent
Galloway

(10) Patent No.: US 7,472,158 B2
(45) Date of Patent: Dec. 30, 2008

(54) INITIATOR CONNECTION TAG FOR SIMPLE TABLE LOOKUP

(75) Inventor: William C. Galloway, Houston, TX (US)

(73) Assignee: Pivot 3, Inc., Spring, TX (US)

( * ) Notice: Subject to any disclaimer, the term of this patent is extended or adjusted under 35 U.S.C. 154(b) by 885 days.

(21) Appl. No.: 10/396,873

(22) Filed: Mar. 26, 2003

(65) Prior Publication Data

US 2004/0205259 A1 Oct. 14, 2004

(51) Int. Cl.
G06F 15/16 (2006.01)
G06F 3/00 (2006.01)

(52) U.S. Cl. .................. 709/203; 709/200; 710/3

(58) Field of Classification Search ............. 709/203, 709/224, 226, 238, 245, 200; 710/74, 3
See application file for complete search history.

(56) References Cited

U.S. PATENT DOCUMENTS

| | | | |
|---|---|---|---|
| 5,249,184 A | 9/1993 | Woest et al. ............. 370/85.8 |
| 5,469,545 A | 11/1995 | Vanbuskirk et al. ..... 395/200.01 |
| 6,138,161 A * | 10/2000 | Reynolds et al. ............. 709/227 |
| 6,209,023 B1 * | 3/2001 | Dimitroff et al. ............. 709/211 |
| 6,430,645 B1 * | 8/2002 | Basham ..................... 710/305 |
| 7,000,174 B2 * | 2/2006 | Mantha et al. ............... 714/790 |
| 7,020,486 B2 * | 3/2006 | Tanada et al. ............. 455/552.1 |
| 2003/0041195 A1 * | 2/2003 | Isoda .......................... 710/104 |

OTHER PUBLICATIONS

American National Standard for Information Technology; *"Fibre Channel Protocol for SCSI;"* Apr. 8, 1996; pp. 1-63.
American National Standard for Information Technology; *"Fibre Channel—Arbitrated Loop (FC-AL);"* Apr. 8, 1996; pp. 1-90.
American National Standard for Information Technology; *Fibre Channel Arbitrated Loop (FC-AL-2);* Dec. 8, 1999; pp. 1-139.
American National Standard for Information Systems; *"Fibre Channel Physical and Signaling Interface (FC-PH) Rev 4.3;"* Working Draft, Jun. 1, 1994; pp. 1-32, 81-160, 205-223 & 230-258.
American National Standard for Information Technology; *"Fibre Channel—Physical and Signalling Interface-2 (FC-PH-2);"* Mar. 12, 1997; pp. 1-4, 17-64, 78-80.

(Continued)

*Primary Examiner*—Ario Etienne
*Assistant Examiner*—El Hadji M Sall
(74) *Attorney, Agent, or Firm*—Wong, Cabello, Lutsch, Rutherford & Brucculeri, LLP

(57) ABSTRACT

SAS devices provide an OPEN frame when requesting a connection or path to a device. An initiator connection tag value, preferably a 16-bit value, is included in this OPEN frame by the initiator. The initiator connection tag value is included by the target device when the target device reconnects to the initiator. The initiator can use this smaller value in a table lookup to rapidly and easily identify the target device, without requiring decoding of the 64-bit WWN and without waiting to receive a frame containing a tag from the target and decoding that tag.

4 Claims, 3 Drawing Sheets

OTHER PUBLICATIONS

American National Standard for Information Technology; "*Fibre Channel—Physical and Signalling Interface-3 (FC-PH-3);*" Apr. 3, 1998; pp. 1-3, 20-39 & 56-61.

American National Standard for Information Technology; "*Serial Attached SCSI (SAS);*" Genuine Draft 11, Mar. 18, 2002; pp. 1-112.

Serial ATA Workgroup; "*High Speed Serialized AT Attachment;*" Revision 1.0, Aug. 29, 2001; pp. 1-306.

American National Standard for Information Technology; "*SCSI Parallel Interface-4 (SPI-4);*" Working Draft, May 2, 2002, 8:11 am; pp. 1-51 & 189-207.

International Committee for Information Technology Standards; "*Information Technology—Serial Attached SCSI (SAS) Project T10/ 1562-D;*" Working Draft, Rev 3b, Jan. 26, 2003.

\* cited by examiner

INITIATOR CONNECTION TAG FOR SIMPLE TABLE LOOKUP

BACKGROUND OF THE INVENTION

1. Field of the Invention

The invention generally relates to storage systems and more particularly to storage systems with initiators and targets which reconnect.

2. Description of the Related Art

Modern computer systems are becoming ever more capable as time passes. One of the limitations in current computer systems has been the disk drives used in direct attach storage. In lower cost computers the disk drives have been connected through an IDE (integrated drive electronics) or ATA (AT Attachment) parallel cable. This cable has a limited length and a limited number of disk drives, normally two, that can be attached. To add more drives, more controllers and cables must be added, which increases system cost. The width of the cable and its limited length has created packaging problems for the installation of a large number of disk drives, which problem is exacerbated if additional controllers and cables are added. The other leading alternative is SCSI (Small Computer System Interface). SCSI also uses a wide cable with limited lengths. However, SCSI can provide more disk drives for any given controller so the number of drives is not as limited. Again, the cable length and width creates problems. All of this must be balanced with the desire to have as many high performance disk drives available as possible to increase overall system performance.

To address some of these problems a consortium was formed to develop the SATA or Serial ATA Specification. The specifications can be obtained at the website serialata.org. The current specifications include Serial ATA, Revision 1.0a dated Jan. 7, 2003 and Serial ATA II: Extensions to Serial ATA 1.0, Revision 1.0, dated Oct. 16, 2002, both of which are hereby incorporated by reference. The SATA specification provides for a very small cable effectively operating as a bi-directional serial link at a very high speed such as 1.5 Gbps or 3.0 Gbps. Because of the small cable sizes and potentially slightly longer lengths, the use of SATA drives is expected to proliferate in the near future, resulting in very large economies of scale. However, SATA drives are port to port devices only, so they are not as useful in more powerful systems such as servers where many drives might be required. Further, they use the IDE or ATA communications protocol, which is not conventionally used by servers, as they conventionally use SCSI signaling protocols.

To address this shortcoming in servers, another consortium developed the SAS or Serial Attached SCSI specification. Layer 0 of an SAS environment is compatible with an SATA environment, therefore allowing duplication and reuse of the high volume SATA drives. The improvements of the SAS specification for server use have primarily been the addition and use of various SCSI commands and the inclusion of expanders to allow additional drives to be controlled by a given processor. The expanders can be attached in a tree structure to allowing inclusion of a very large number of drives or targets. An expander essentially operates as a crossbar switch between its various ports, thus creating the point to point, dedicated link need for SATA or SAS drives.

One limitation in prior systems which could address specific drives, such as SCSI, was a limited number of addresses, such as 16 in SCSI-2. To resolve this problem, SAS elected to use a 64-bit Worldwide Name (WWN) as the address for each device. While this provided for very large numbers of devices, a problem developed in the initiators. In a multiple device environment, it is common to use the device address in a lookup table to determine device and/or thread related information, such as table pointers and so on. This is easily done when only 16 devices can be present, or even 32 if two SCSI buses are present on the initiator, but it is effectively impossible with a 64-bit WWN. Thus the most efficient manner of determining the related information was lost, with the other options resulting in performance degradation.

One of these other options involved waiting until the first command or data frame is received and parsing the frame header for a tag value that was previously assigned by the initiator. But this required waiting until the frame was received and checked before any operations could begin. Thus any performance would be degraded by these delays.

It would be desirable to have the large addressing space but also to have a way to quickly use the table indexing methods to obtain device related information.

BRIEF SUMMARY OF THE INVENTION

SAS devices provide an OPEN frame when requesting a connection or path to a device. An initiator connection tag value, preferably a 16-bit value, is included in this OPEN frame by the initiator. The initiator connection tag value is included by the target when the target reconnects to the initiator. The initiator can use this smaller value in a table lookup to rapidly and easily identify the target, without requiring decoding of the 64-bit WWN and without waiting to receive a frame containing a target port transfer tag from the target and decoding that tag.

Therefore a technique is provided to allow the fast, early table lookup and yet retain the large addressing space provided in SAS.

DETAILED DESCRIPTION OF PREFERRED EMBODIMENT

Figure 1:
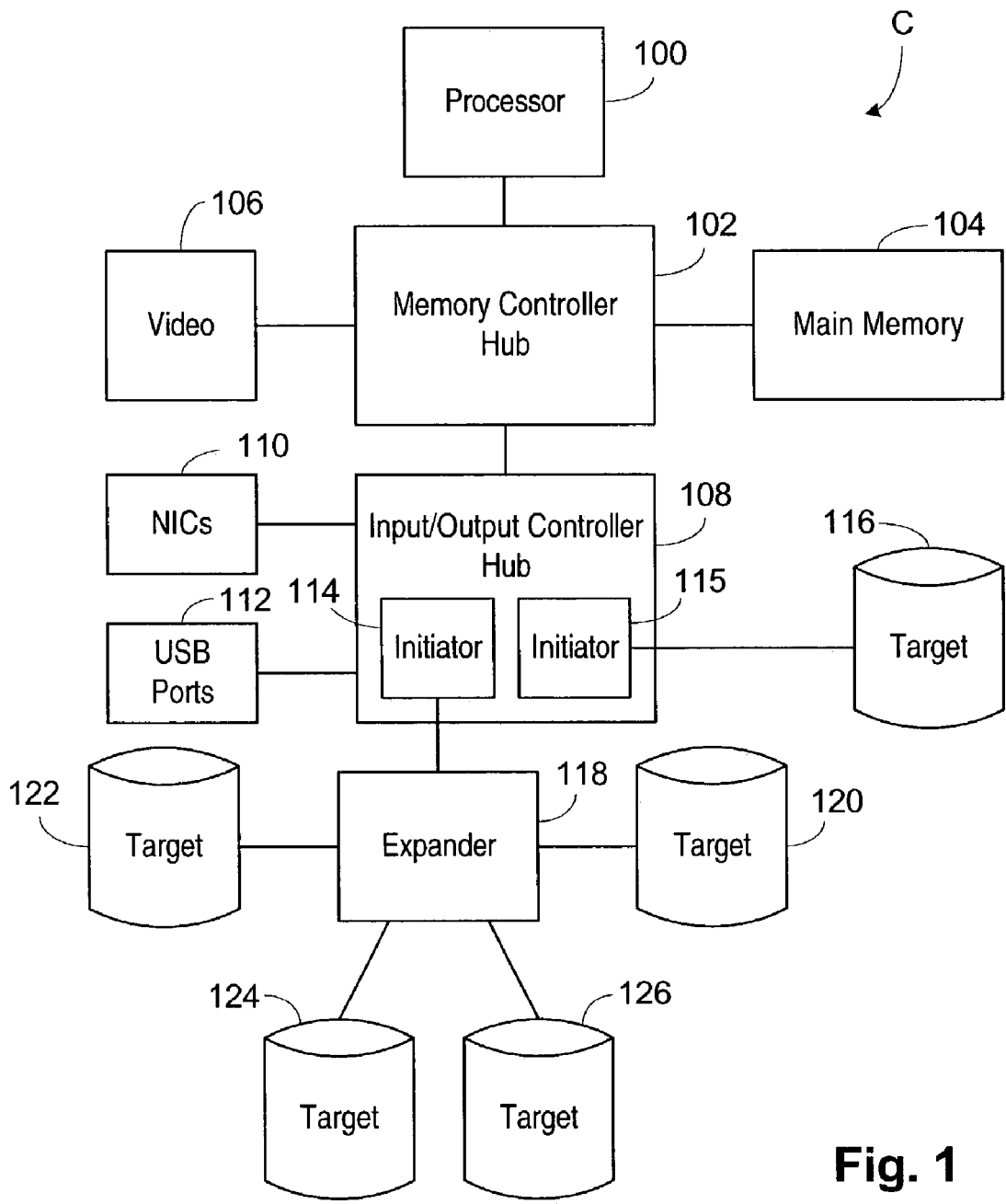
FIG. 1 illustrates a block diagram of a computer system utilizing an SAS system according to an embodiment of the present invention.

Referring now to FIG. 1, a computer C generally includes a Serial Attached SCSI (SAS) system including arbitration according to an embodiment of the present invention. A processor 100 is connected to a memory controller hub (MCH) 102. In turn the memory controller hub 102 is connected to main memory 104 and a video system 106. In this manner of the processor 100 can address the main memory 104 through the memory controller hub 102. The video control system 106 can also access the main memory 104 if desired and can be accessed by the processor 100. The memory controller hub 102 is connected to an input/output controller hub (IOCH) 108. The IOCH 108 is connected to or includes a plurality of network interface ports 110. The network interface ports can be typical wired Ethernet ports, can be wireless Ethernet ports or can be other wireless protocols such as Bluetooth. A series of USB ports 112 are also connected to the IOCH 108 to provide peripheral expansion for devices such as keyboards, printers, scanners and the like. This is an exemplary computer architecture and many variations can be used, such as those using North and South bridges, multiple processors, multiple IOCHs, single chip implementations and so on.

More relevant to the present invention, initiators 114 and 115 are located in the IOCH 108 or can be a separate unit connected to the IOCH 108. Preferably these initiators 11 and 115 are compatible with the SAS standard. In the illustrated embodiment, a first target drive 116 is connected directly to the initiator 115. An expander 118, again preferably according to the SAS standard, is connected to the initiator 114. The expander provides the capability to attach additional targets or hard drives for control by the initiator 114. To this end, targets 120, 122, 124 and 126 are shown connected to the expander 118. Preferably all of the targets are SAS compatible targets. The current draft of the SAS specification is Revision 3c dated Feb. 9, 2003 and is Project T10 1562-D of the incits T10 Technical committee (T10.org). The current specification is available from the T10 committee via the website and is hereby incorporated by reference.

Figure 2:
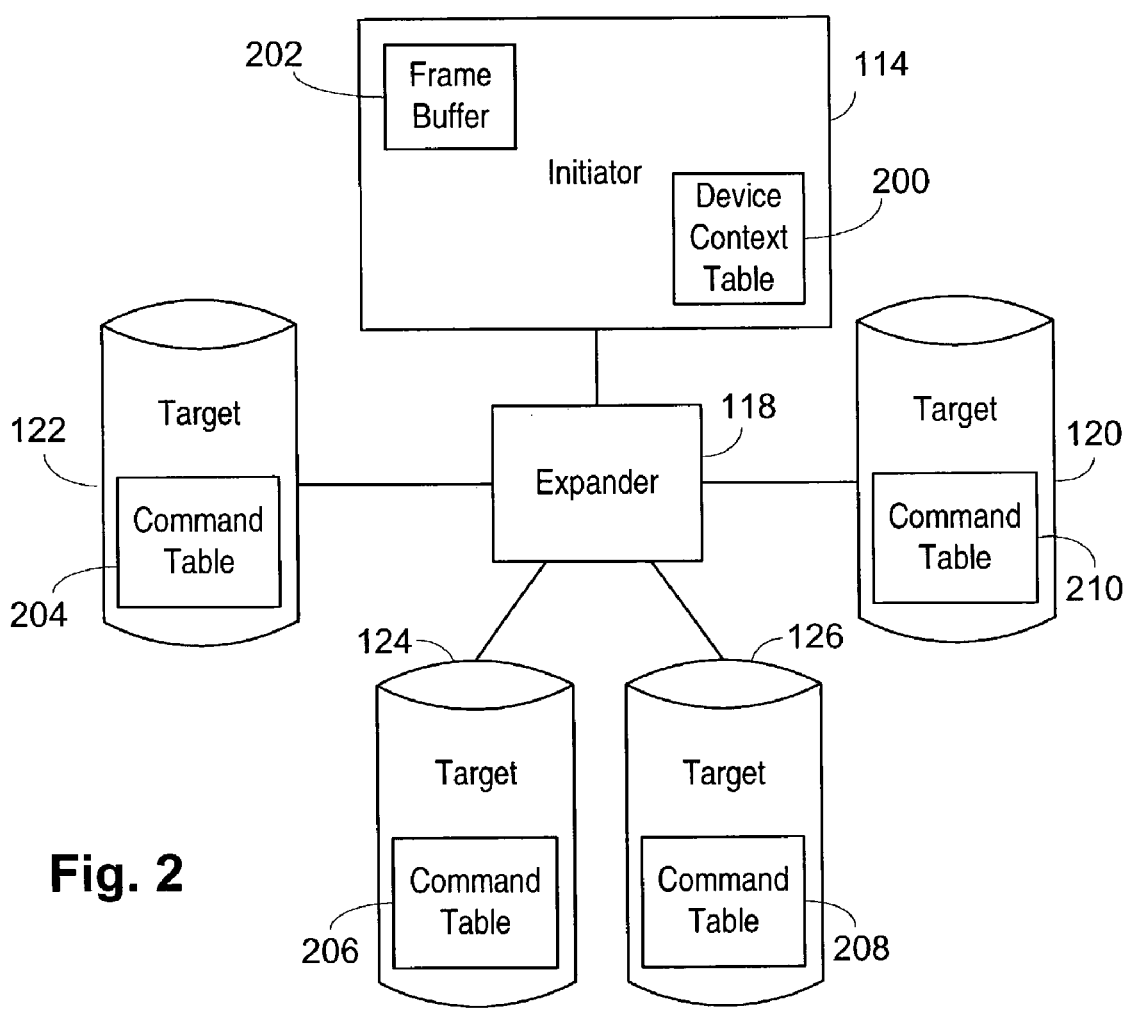
FIG. 2 illustrates the SAS devices of FIG. 1 with various internal buffers and tables.
Figure 3:
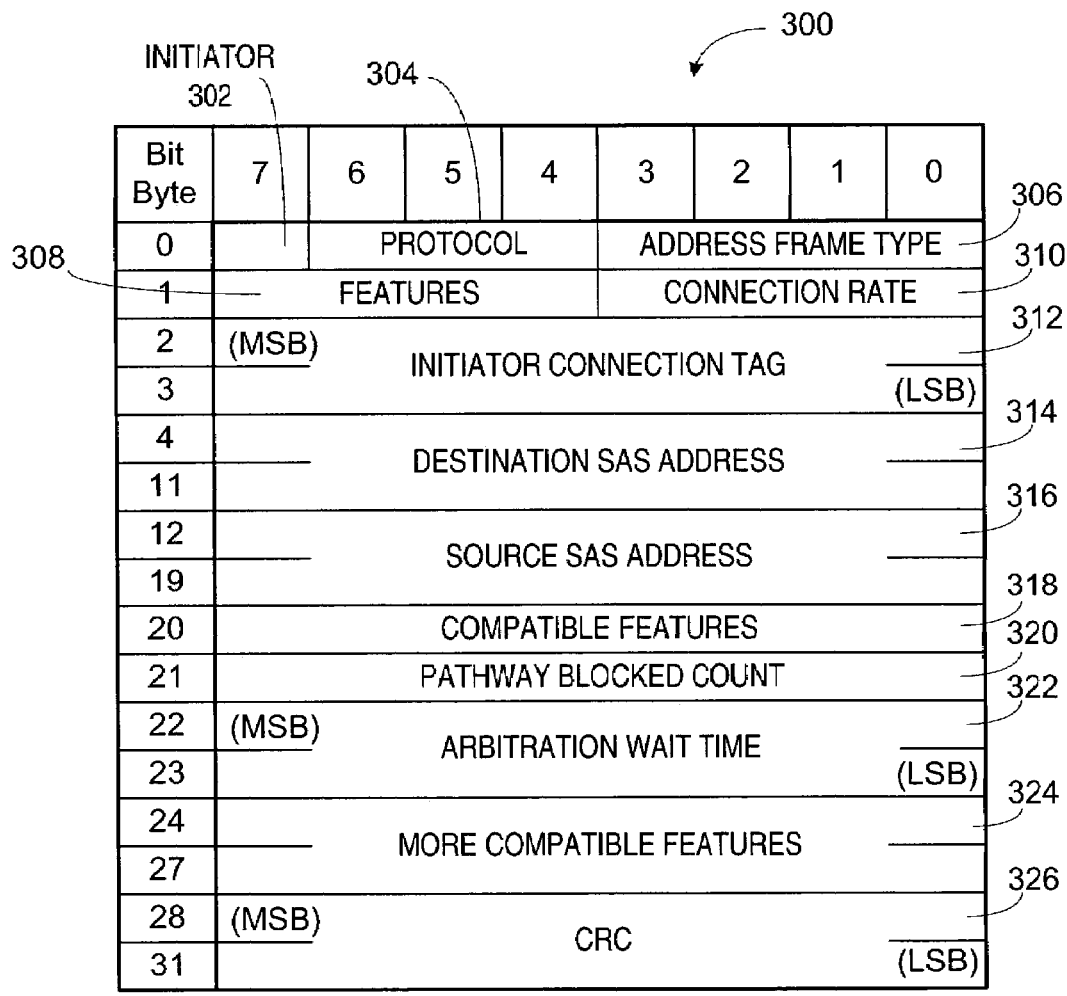
FIG. 3 illustrates an OPEN frame according to the preferred embodiment.

Referring then to FIG. 2, the SAS devices of FIG. 1 are illustrated in more detail. Each initiator includes a context table where information about the particular devices and/or threads is stored. Typically this information includes various pointers to all of the outstanding commands for the devices and all of the frames to be transmitted to each device. In the illustration the initiator 114 includes a device-context table 200 and also a frame buffer 202. The frame buffer 202 holds command and data frames to be transmitted to the various devices. Entries related to these frames are included in the device context table 200. The targets 120-126 each include a command table 204-210, with the initiator connection tag value contained in the stored information on each command. The initiator 114 preferably accesses the entries in the context table by using an initiator connection tag as an index into the tables. The initiation connection tag is shown in FIG. 3, a drawing of a current OPEN frame. There are various initial entries in the frame. These initial entries include an Initiator bit 302, protocol bits 304, an Address Frame Type 306, a Features field 308 and a Connection Rate field 310. The Initiator bit set to one indicates the source device is acting as an initiator device. An Initiator bit set to zero indicates the source device is acting as a target device. If a target/initiator device sets the Initiator bit to one, it shall operate only in its initiator role during the connection. If a target/initiator device sets the Initiator bit to zero, it shall operate only in its target role during the connection. The Protocol field indicates the protocol for the connection being requested. The Address Frame Type field shall be set to 1 h. The Features field shall be set to zero. The Connection Rate field indicates the connection rate being requested between the source and destination. Then the initiator connection tag 312-is provided by logic, either hardware, software, or a combination, in the initiator 114. This is preferably a 16-bit value. The next two fields are the 64-bit destination and source SAS addresses 314 and 316. The destination address will have been determined by prior operations of the initiator and the initiator will know its own address. The desired destination address and the source address are provided logic, again either hardware, software or a combination, in the initiator 114. A few additional fields are provided. These fields include a Compatible Features Field 318, a Pathway Blocked Count 320, an Arbitration Wait Time value 322 and a field for More Compatible Features 324. The Compatible Features field shall be set to zero. The Pathway Blocked Count field indicates the number of times the port has retried this connection request. The Arbitration Wait Time field indicates how long the port transmitting the OPEN address frame has been waiting for a connection request to be accepted. The More Compatible Features field shall be set to zero. The frame ends with a 32 bit CRC value 326. The CRC field is a CRC value that is computed over the entire frame.

It is understood that the values in various fields such as Features, Compatible Features, and More Compatible Features could change if standard feature values are selected. It is also understood that the address frame type could be a different value if additional frame types are standardized.

The initiator connection tag 312 is originally provided by the initiator 114 when opening a connection to a target device, target device 122 in this example. Logic, either hardware, software or a combination, in the target device 122 receives the OPEN frame 300 and stores the initiator connection tag 312 with the command entry in the command table 204 for the particular upcoming command. The initiator 114 might then transmit a read request to the target 122. The target device 122 will acknowledge the request and then close the path to the initiator 114 while the target device 122 obtains the requested data. When the requested data has been obtained, logic, either hardware, software or a combination, in the target device 122 transmits an OPEN frame 300 to the initiator 114 to reconnect the devices. This OPEN frame 300 will include the initiator connection tag 312 originally provided by the initiator 114. Logic, either hardware, software or a combination, in the initiator 114 will retrieve this value from the OPEN frame and use it as an index into the context table 200 to obtain the context for the transaction. The initiator 114 will also realize that a connection or path has been opened to the target device 122. Because a SAS connection is full duplex, the initiator 114 can provide any additional frames to the target device 122. The presence of these additional pending frames could be indicated in the context table 200 or a separate index operation could occur, preferably simultaneously. With the lookup the initiator 114 will determine that a frame is available for the target and can immediately transmit the frame to the target device 122. The initiator 114 does not have to wait for any further frames from the target device 122 to easily indicate a connection to that particular target device 122, such as waiting to decode the tag in the header of the remaining frames. Further, the initiator 114 does not have to do a lengthy decode of the 64-bit-WWN of the source address 316 of the OPEN frame 300.

Thus an initiator can rapidly and efficiently determine context information when a target device reconnects to the initiator, allowing any waiting information to be provided to the target device after a minimal delay and yet the full 64-bit addressing of devices is available. Thus overall performance of the SAS subsystem is improved.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

The invention claimed is:

1. A computer system comprising:
   a processor;
   main memory;
   a bridge circuit connected to said processor and said main memory; and
   an initiator device coupled to said bridge circuit for interacting with a target device over a network, the initiator device providing a frame requesting a connection to a target device and receiving a frame requesting a connection from the target device, each device having a long address, said initiator device including:

logic for providing an initiator connection tag which is appreciably shorter than a device address to the initiator frame requesting a connection;

logic for providing a destination device address of the target device to the initiator frame requesting a connection;

logic for providing a source device address of the initiator device to the initiator frame requesting a connection;

a lookup table containing context information relating to the target device;

logic for retrieving an initiator connection tag from a received frame requesting a connection from a target device; and logic for using said retrieved initiator connection tag to address said lookup table to obtain context information relating to the target device.

2. The computer system of claim 1, wherein the device addresses are 64 bits long and said initiator connection tag is 16 bits long.

3. A system comprising:

a computer system including:
 a processor;
 main memory;
 a bridge circuit connected to said processor and said main memory; and
 an initiator device coupled to said bridge circuit, said initiator device providing a frame requesting a connection to a target device and receiving a frame requesting a connection from the target device, each device having a long address, said initiator device including:

logic for providing an initiator connection tag which is appreciably shorter than a device address to the initiator frame requesting a connection;

logic for providing a destination device address of the target device to the initiator frame requesting a connection;

logic for providing a source device address of the initiator device to the initiator frame requesting a connection;

a lookup table containing context information relating to said target device;

logic for retrieving an initiator connection tag from a received frame requesting a connection from a target device; and logic for using said retrieved initiator connection tag to address said lookup table to obtain context information relating to the target device, and a target device coupled to said initiator device, the target device providing a frame requesting a connection to the initiator device, the target frame including a shorter initiator connection tag and long destination and source device addresses, said target device including:

a table containing command and context information relating to said initiator device;

logic for retrieving the initiator connection tag from an initiator frame and storing it in said table; and logic for retrieving the initiator connection tag from said table and providing it for inclusion in the target frame.

4. The system of claim 3, wherein the device addresses are 64 bits long and said initiator connection tag is 16 bits long.

* * * * *